US012744846B2

(12) United States Patent
Kakinaga et al.

(10) Patent No.: US 12,744,846 B2
(45) Date of Patent: Sep. 22, 2026

(54) SERVER APPARATUS, TELEPHONE CONNECTION METHOD AND TELEPHONE CONNECTION PROGRAM

(71) Applicant: NEC Platforms, Ltd., Kawasaki (JP)

(72) Inventors: Naomi Kakinaga, Kanagawa (JP); Kiyohide Sutou, Kanagawa (JP); Masaru Kubota, Kanagawa (JP); Hikaru Udagawa, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 18/287,768

(22) PCT Filed: Dec. 23, 2021

(86) PCT No.: PCT/JP2021/048020

§ 371 (c)(1),
(2) Date: Oct. 20, 2023

(87) PCT Pub. No.: WO2023/074006

PCT Pub. Date: May 4, 2023

(65) Prior Publication Data

US 2024/0364813 A1 Oct. 31, 2024

(30) Foreign Application Priority Data

Oct. 29, 2021 (JP) ................................ 2021-177045

(51) Int. Cl.
*H04M 3/00* (2024.01)
*H04L 12/66* (2006.01)
(Continued)

(52) U.S. Cl.
CPC ......... *H04M 3/465* (2013.01); *H04M 7/0033* (2013.01)

(58) Field of Classification Search
CPC ........... H04L 2101/668; H04L 61/2503; H04L 61/5007; H04L 65/1069; H04L 65/1101;
(Continued)

(56) References Cited

U.S. PATENT DOCUMENTS 6,307,929 B1 * 10/2001 Baiyor .................. H04M 3/436 379/211.01
6,434,226 B1 8/2002 Takahashi
(Continued)

FOREIGN PATENT DOCUMENTS

CN 1614976 A 5/2005
JP H08-125754 A 5/1996
(Continued)

OTHER PUBLICATIONS

International Search Report for PCT Application No. PCT/JP2021/048020, mailed on Mar. 22, 2022.
(Continued)

*Primary Examiner* — Kharye Pope
(74) *Attorney, Agent, or Firm* — Sughrue Mion, PLLC

(57) ABSTRACT

There is provided a server apparatus, comprising a notification part that, when receiving an incoming call to a representative telephone number, multicastingly notifies a plurality of staff terminals previously registered in association with the representative telephone number of an occurrence of the incoming call, and a connection part that, when receiving an answering operation from a first staff terminal, calls a telephone number of the first staff terminal via a telephone exchanger to establish a telephone connection thereto.

17 Claims, 18 Drawing Sheets

(51) Int. Cl.
*H04M 3/46* (2006.01)
*H04M 5/00* (2006.01)
*H04M 7/00* (2006.01)

(58) Field of Classification Search
CPC . H04L 67/306; H04L 12/185; H04L 65/1104; H04L 67/141; H04L 65/401; H04L 12/4641; H04L 67/1044; H04L 12/189; H04W 72/30; H04W 4/08; H04W 4/12; H04W 4/16; H04W 4/06; H04W 68/00; H04W 4/80; H04W 76/10; H04W 76/40; H04M 3/5191; H04M 2203/10; H04M 3/42042; H04M 3/42382; H04M 3/5175; H04M 2203/402; H04M 3/42; H04M 3/58; H04M 3/465; H04M 2203/2072; H04M 3/42365; H04M 3/46; H04M 3/436
See application file for complete search history.

(56) References Cited

U.S. PATENT DOCUMENTS 8,107,957 B1 * 1/2012 O'Neil .............. H04M 3/42229 455/445
8,452,315 B1 * 5/2013 Cai ....................... H04W 76/40 455/518
8,600,417 B1 * 12/2013 Mateer .................... H04W 4/14 455/418
2005/0013421 A1 * 1/2005 Chavez ............. H04M 3/42382 379/93.09
2008/0200158 A1 * 8/2008 Harris ................... H04W 72/30 455/416
2009/0005024 A1 * 1/2009 Kato ................... H04M 1/2745 455/417
2009/0097631 A1 * 4/2009 Gisby ................... H04M 3/465 379/211.02
2009/0280789 A1 11/2009 Takuno et al.
2010/0046731 A1 * 2/2010 Gisby ................... H04M 3/436 379/211.01
2013/0303133 A1 * 11/2013 Sansalone ............. H04W 76/15 455/414.1
2014/0006589 A1 * 1/2014 Verrall .................... H04L 43/08 709/224
2014/0110626 A1 4/2014 Shi et al.
2014/0335823 A1 * 11/2014 Heredia .................. H04W 4/50 455/411
2022/0006697 A1 * 1/2022 Hill ..................... H04L 41/0883
2022/0294891 A1 * 9/2022 Liu ....................... H04M 3/465

FOREIGN PATENT DOCUMENTS

| | | | |
|---|---|---|---|
| JP | H10-240656 | A | 9/1998 |
| JP | H10-285620 | A | 10/1998 |
| JP | H11-136364 | A | 5/1999 |
| JP | 2005-217719 | A | 8/2005 |
| JP | 2011-009884 | A | 1/2011 |
| JP | 2012-095126 | A | 5/2012 |
| JP | 2014-049914 | A | 3/2014 |
| JP | 2015-213196 | A | 11/2015 |
| JP | 2015-231196 | A | 12/2015 |
| JP | 6321264 | B1 | 5/2018 |
| JP | 6620256 | B2 | 12/2019 |
| JP | 2020-047974 | A | 3/2020 |
| WO | 2006/129692 | A1 | 12/2006 |
| WO | 2014/038156 | A1 | 3/2014 |

OTHER PUBLICATIONS

Canadian Office Communication for CA Application No. 3218396, mailed on Jan. 22, 2025.
European Search Report for EP Application No. 21962543.1, dated on Mar. 3, 2025.

* cited by examiner

CUSTOMER TERMINAL
EXTERNAL TELEPHONE NETWORK
30
TELEPHONE EXCHANGER
INTERNAL TELEPHONE NETWORK
40
REPRESENTATIVE TELEPHONE MACHINE
40a-c
TELEPHONE MACHINE
10
SERVER APPARATUS
INTERNET
20a
STAFF TERMINAL
20b
STAFF TERMINAL
20c
STAFF TERMINAL

FIG. 3

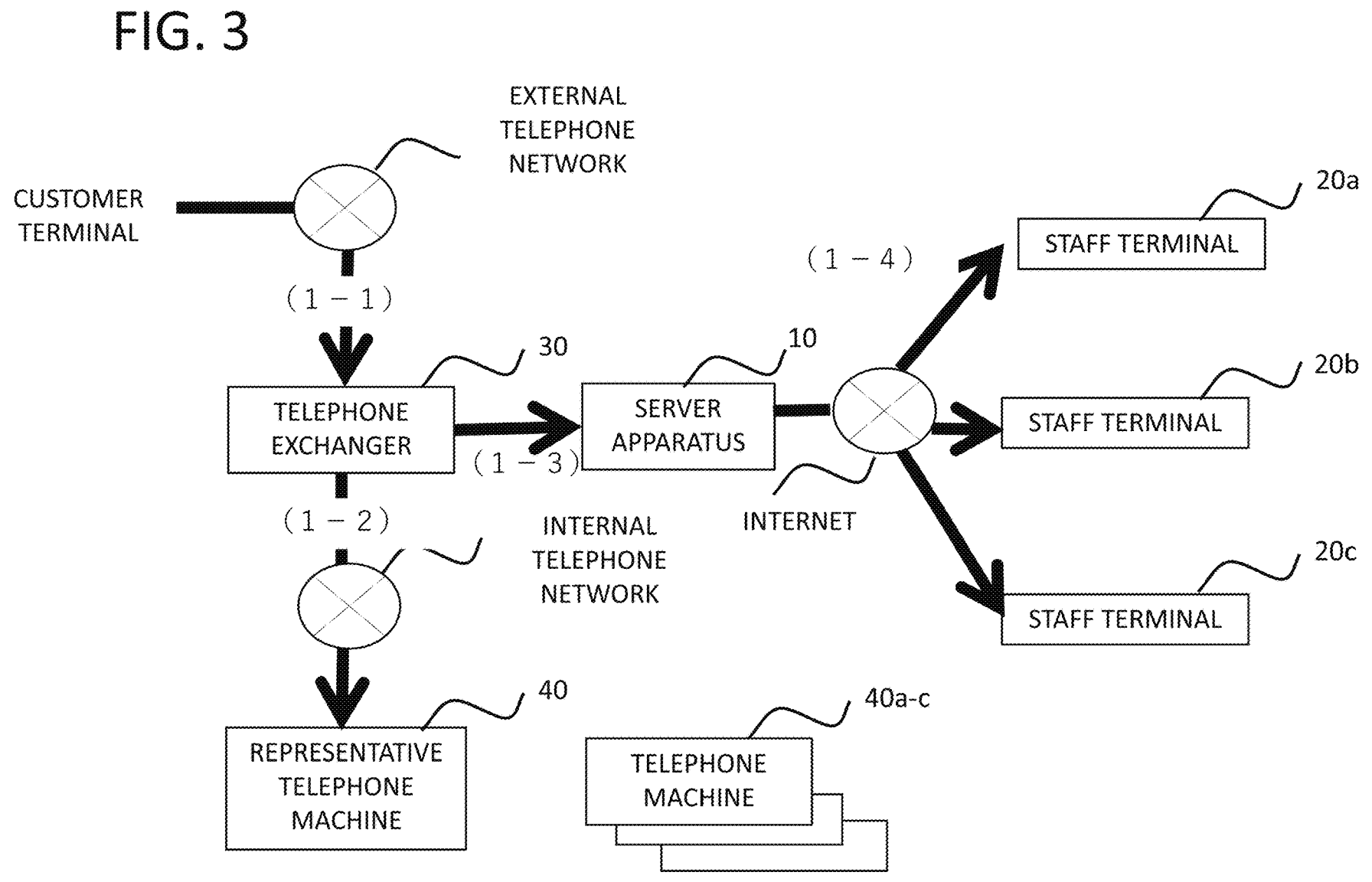

CUSTOMER TERMINAL
EXTERNAL TELEPHONE NETWORK
(1 − 1)
TELEPHONE EXCHANGER
30
(1 − 2)
INTERNAL TELEPHONE NETWORK
REPRESENTATIVE TELEPHONE MACHINE
40
(1 − 3)
SERVER APPARATUS
10
INTERNET
TELEPHONE MACHINE
40a-c
(1 − 4)
STAFF TERMINAL
20a
STAFF TERMINAL
20b
STAFF TERMINAL
20c

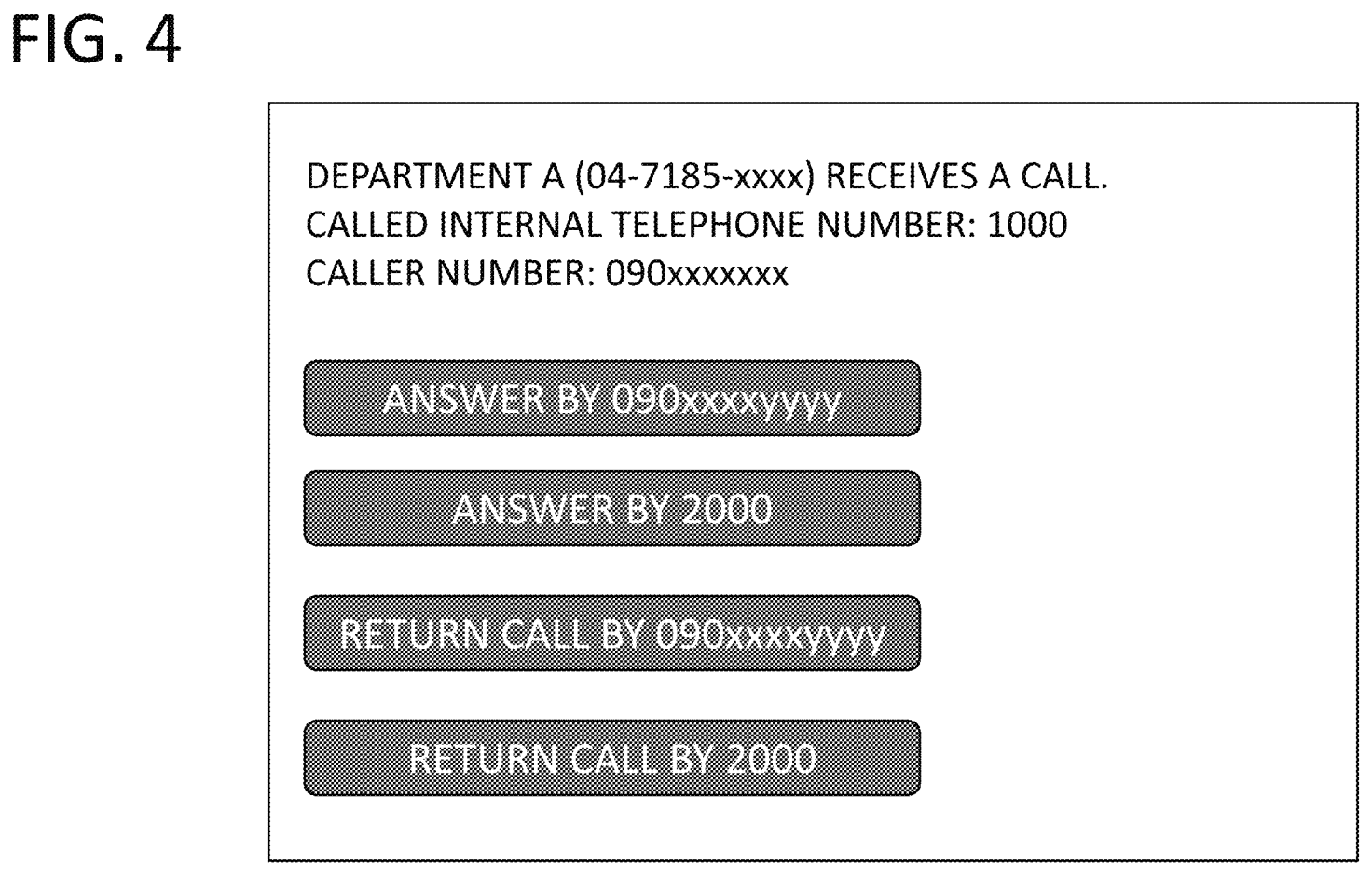

DEPARTMENT A (04-7185-xxxx) RECEIVES A CALL.
CALLED INTERNAL TELEPHONE NUMBER: 1000
CALLER NUMBER: 090xxxxxxxx ANSWER BY 090xxxxyyyy

ANSWER BY 2000

RETURN CALL BY 090xxxxyyyy

RETURN CALL BY 2000

FIG. 4

CUSTOMER TERMINAL
EXTERNAL TELEPHONE NETWORK
(2－2)
30
TELEPHONE EXCHANGER
(2－2)
10
SERVER APPARATUS
INTERNET
(2－1)
20a
STAFF TERMINAL
20b
STAFF TERMINAL
20c
STAFF TERMINAL
INTERNAL TELEPHONE NETWORK
40
REPRESENTATIVE TELEPHONE MACHINE
40a-c
TELEPHONE MACHINE

EXTERNAL TELEPHONE NETWORK
CUSTOMER TERMINAL
20a
STAFF TERMINAL
(2－3’)
30
10
(2－1’)
TELEPHONE EXCHANGER
SERVER APPARATUS
(2－3’’)
(2－2’)
INTERNAL TELEPHONE NETWORK
INTERNET
20b
STAFF TERMINAL
(2－3’)
40
40a-c
REPRESENTATIVE TELEPHONE MACHINE
TELEPHONE MACHINE
20c
STAFF TERMINAL

FIG. 7

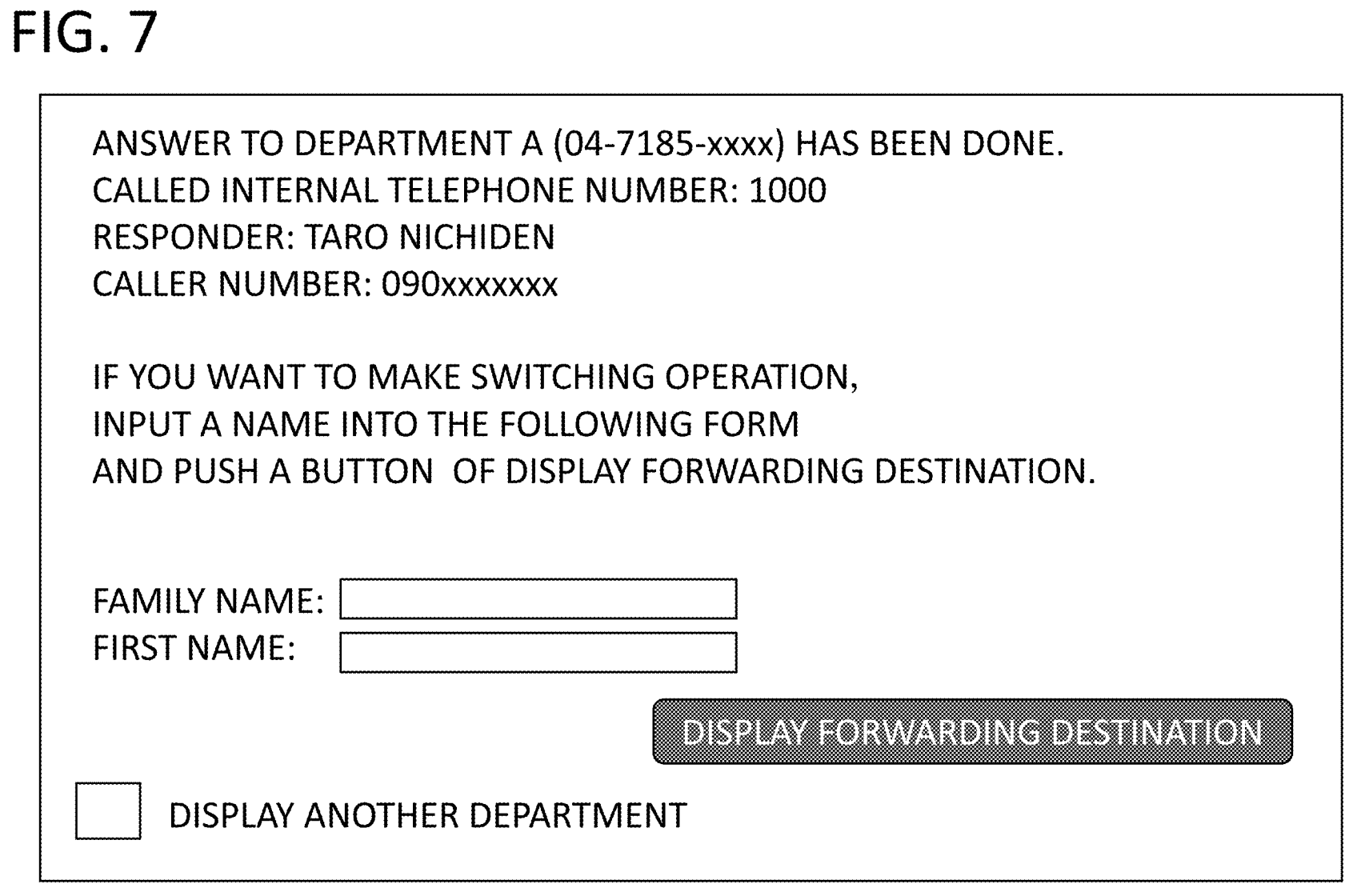

ANSWER TO DEPARTMENT A (04-7185-xxxx) HAS BEEN DONE.
CALLED INTERNAL TELEPHONE NUMBER: 1000
RESPONDER: TARO NICHIDEN
CALLER NUMBER: 090xxxxxxx IF YOU WANT TO MAKE SWITCHING OPERATION,
INPUT A NAME INTO THE FOLLOWING FORM
AND PUSH A BUTTON OF DISPLAY FORWARDING DESTINATION.

FAMILY NAME:
FIRST NAME:

DISPLAY FORWARDING DESTINATION

DISPLAY ANOTHER DEPARTMENT

Figure 11:
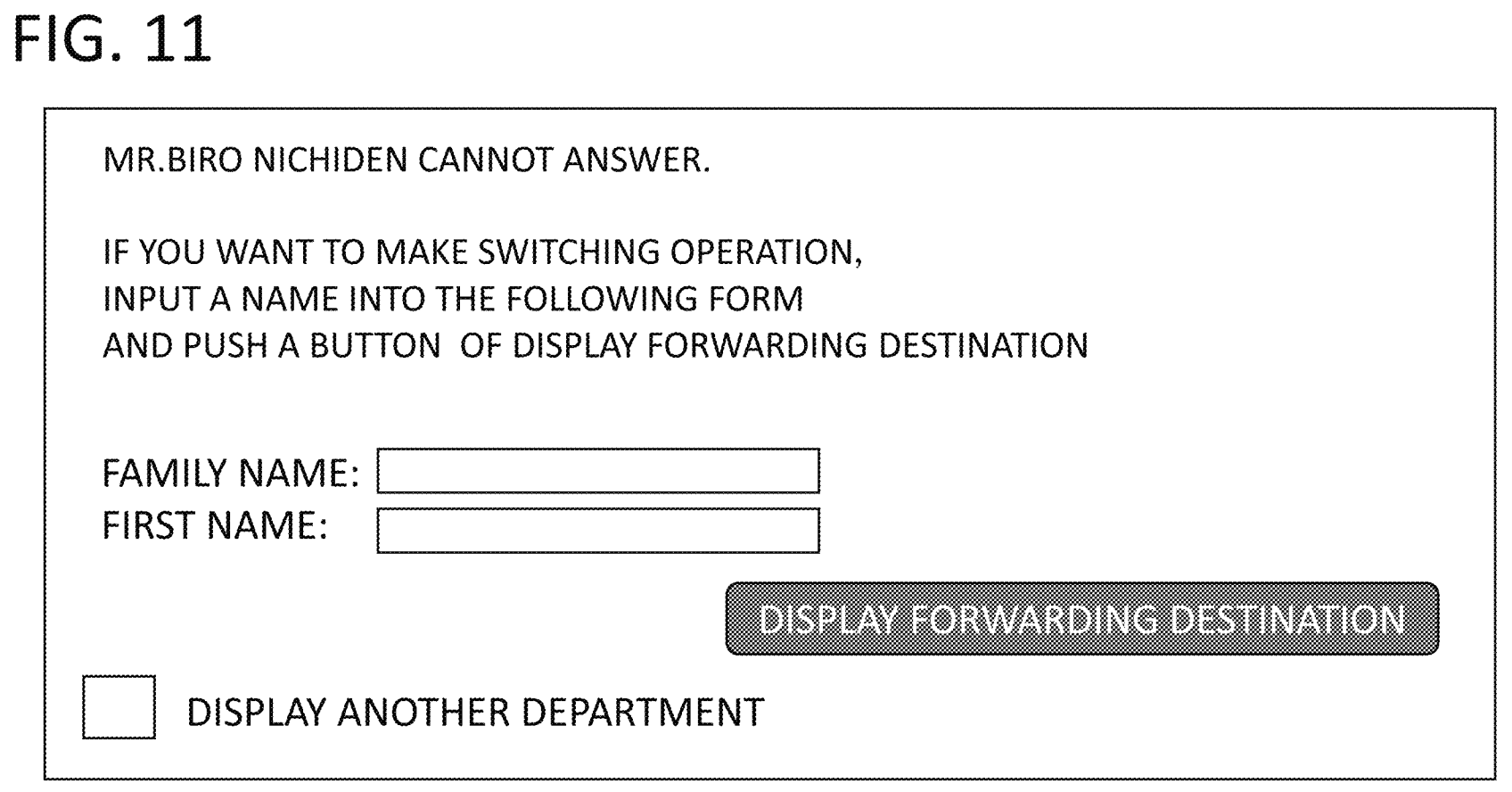

MR.BIRO NICHIDEN CANNOT ANSWER.

IF YOU WANT TO MAKE SWITCHING OPERATION,
INPUT A NAME INTO THE FOLLOWING FORM
AND PUSH A BUTTON OF DISPLAY FORWARDING DESTINATION

FAMILY NAME:
FIRST NAME:

DISPLAY FORWARDING DESTINATION

DISPLAY ANOTHER DEPARTMENT

FIG. 13

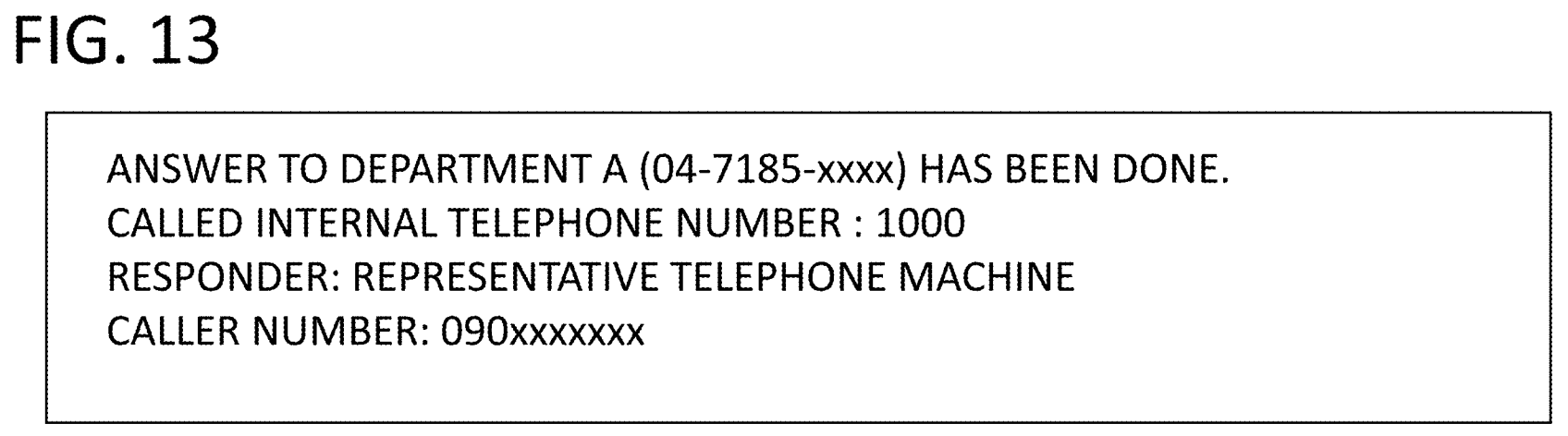

ANSWER TO DEPARTMENT A (04-7185-xxxx) HAS BEEN DONE.
CALLED INTERNAL TELEPHONE NUMBER : 1000
RESPONDER: REPRESENTATIVE TELEPHONE MACHINE
CALLER NUMBER: 090xxxxxxxx CALL TO DEPARTMENT A (04-7185-xxxx) WAS DISCONNECTED.
CALLED INTERNAL TELEPHONE NUMBER : 1000

TARO NICHIDEN PERFORMED A RETURN CALL.
DESTINATION: 090xxxxxxxx

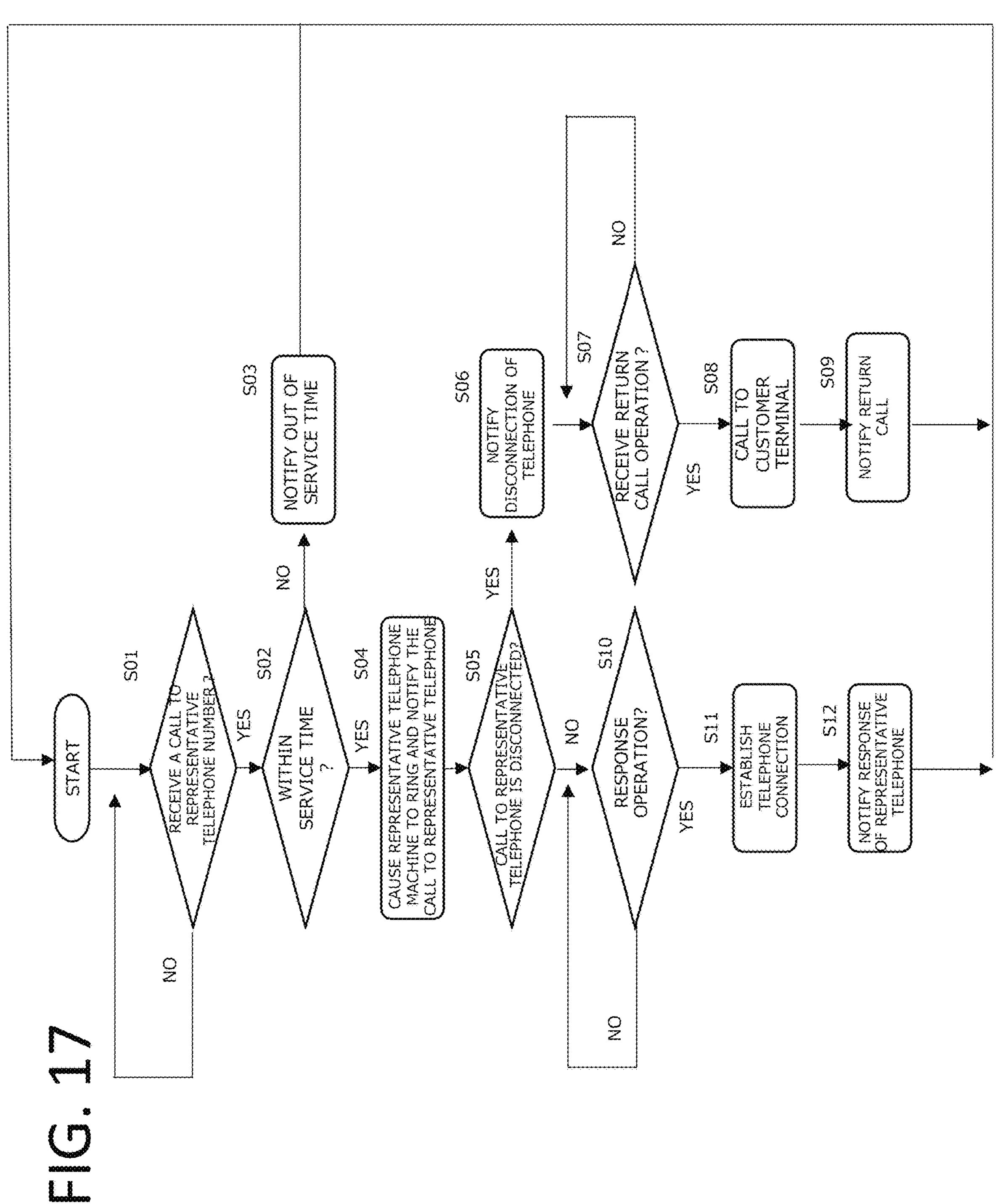
FIG. 17
START
S01
RECEIVE A CALL TO REPRESENTATIVE TELEPHONE NUMBER ?
NO
YES
S02
WITHIN SERVICE TIME ?
NO
S03
NOTIFY OUT OF SERVICE TIME
YES
S04
CAUSE REPRESENTATIVE TELEPHONE MACHINE TO RING AND NOTIFY THE CALL TO REPRESENTATIVE TELEPHONE
S05
CALL TO REPRESENTATIVE TELEPHONE IS DISCONNECTED?
YES
S06
NOTIFY DISCONNECTION OF TELEPHONE
S07
RECEIVE RETURN CALL OPERATION ?
NO
YES
S08
CALL TO CUSTOMER TERMINAL
S09
NOTIFY RETURN CALL
NO
S10
RESPONSE OPERATION?
NO
YES
S11
ESTABLISH TELEPHONE CONNECTION
S12
NOTIFY RESPONSE OF REPRESENTATIVE TELEPHONE

SERVER APPARATUS, TELEPHONE CONNECTION METHOD AND TELEPHONE CONNECTION PROGRAM

CROSS-REFERENCE TO RELATED APPLICATION

This application is a National Stage Entry of PCT/JP2021/048020 filed on Dec. 23, 2021, which claims priority from Japanese Patent Application 2021-177045 filed on Oct. 29, 2021, the contents of all of which are incorporated herein by reference, in their entirety.

The present invention relates a server apparatus, a telephone connection method and a telephone connection program.

FIELD

Background

There is a technology, so-called "call pickup", that realizes substitutive answering to an incoming call to a certain telephone machine with another telephone machine. (for example, Patent Literature 1)

PTL 1: Patent JP 6620256 B

SUMMARY

The following analysis is made from an aspect of the present invention. Herein, disclosure of the document cited above is incorporated in the present application by reference thereto.

In recent years, a working style, such as telework and the like, is adopted, under which a staff does not come to an office, thus there are needs to realize a telephone response (answering) as if the staff is at the office even when the staff is not working at the office. However, the technology of Patent Literature 1 merely achieves selection of a telephone machine to be used for substitutive answering from a plurality of telephone machines, thus the needs have not been satisfied.

Accordingly, it is a purpose of the present invention to provide a technology realizing a telephone response as if a staff is at the office even when the staff is not working at the office (or company).

Solution to Problem

According to first aspect of the present invention, there is provided a server apparatus, comprising

- a notification part that, when receiving an incoming call to a representative telephone number, multicastingly notifies a plurality of staff terminals previously registered in association with the representative telephone number of an occurrence of the incoming call, and
- a connection part that, when receiving an answering operation (response operation) from a first staff terminal, calls a telephone number of the first staff terminal via a telephone exchanger to establish a telephone connection thereto.

According to second aspect of the present invention, there is provided

- a telephone connection method, comprising
- a notification step of, when receiving an incoming call to a representative telephone number, multicastingly notifying a plurality of staff terminals previously registered in association with the representative telephone number of an occurrence of the incoming call, and
- a connection step of, when receiving an answering operation from a first staff terminal, calling a telephone number of the first staff terminal via a telephone exchanger to establish a telephone connection thereto.

According to third aspect of the present invention, there is provided a telephone connection program, causing a computer to execute:

- a notification process of, when receiving an incoming call to a representative telephone number, multicastingly notifying a plurality of staff terminals previously registered in association with the representative telephone number of an occurrence of the incoming call, and
- a connection process of, when receiving an answering operation from a first staff terminal, calling a telephone number of the first staff terminal via a telephone exchanger to establish a telephone connection thereto.

Advantageous Effects of Invention

According to each aspect of the present invention, there are provided a server apparatus, a telephone connection method and a telephone connection program that contribute to realize a telephone response (answering) as if a staff is at an office (or company) even when the staff is not working at the office (or company).

BRIEF DESCRIPTION OF THE DRAWINGS

FIG. 3 is a diagram showing one outline of a representative incoming call notification.

FIG. 4 is a diagram showing one example of information to be notified by the representative incoming call notification.

FIG. 7 is a diagram showing one example of information to be notified by a representative telephone response notification.

FIG. 8 is a diagram showing one example of information to be notified by the representative telephone response notification.

FIG. 11 is a diagram showing one example of information to be notified at the time of representative telephone switching.

FIG. 13 is a diagram showing one example of information to be notified at the time of representative telephone response by a representative telephone machine 40.

FIG. 14 is a diagram showing one example of information to be notified by a representative telephone intermediate abandonment notification.

FIG. 15 is a diagram showing one example of information to be notified by a return call notification.

FIG. 17 is a flowchart diagram showing an operation flow by the server apparatus 10.

EXAMPLE EMBODIMENTS

A preferable exemplary embodiment which may be realized by the present invention is explained in detail with reference to the drawings. Herein, reference signs in the following description are expediently attached to each element as an explanatory aid for understanding, but not for limitation of the present invention to an illustrated configuration. In addition, connection lines between blocks in each figure include both of bidirectional and one directional. One way arrow schematically indicates a flow of main signal (data), thus does not exclude bidirectional. In addition, in a circuit diagram, a block diagram, an inner configuration diagram, a connection diagram, etc., illustrated in the present disclosure, an input/output ends of each connection lines respectively have input/output ports, but explicit indications thereof are omitted. The same is applied to input/output interfaces, too.

Figure 1:
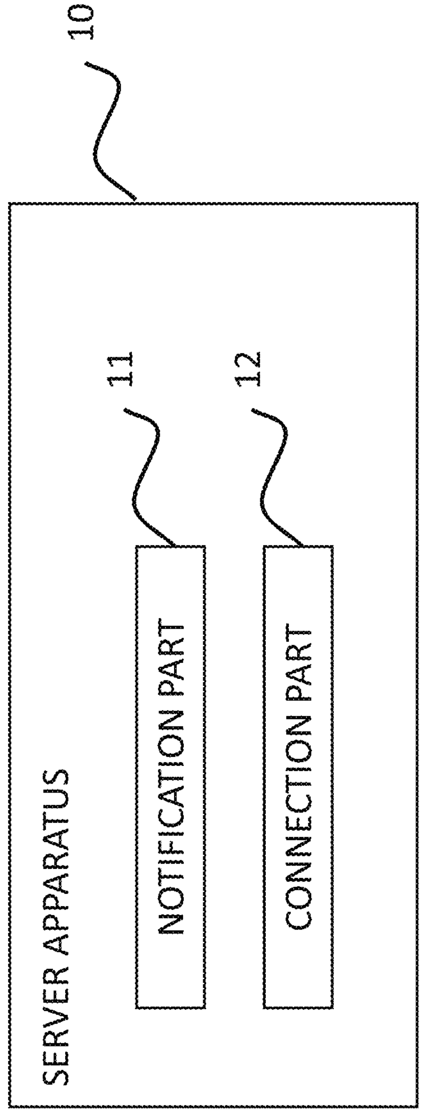
FIG. 1 is an explanatory view of one outline of the present invention.

First, one outline of the present invention is explained. As illustrated in FIG. 1, a server apparatus 10 comprises a notification part 11 and a connection part 12. When receiving an incoming call to a representative telephone number (a main number of an office), the notification part 11 multicastingly (at once to staff terminals) notifies a plurality of staff terminals 20*a*-20*c* (see FIG. 2 and the like) which are previously registered in association with the representative telephone number of an occurrence of an incoming call. When receiving an answering operation from a first staff terminal 20*a*, the connection part 12 calls a telephone number of the first staff terminal 20*a* via a telephone exchanger 30 (see FIG. 2 and the like) to establish a telephone connection thereto.

The outline is concretely explained by exemplifying one situation. In a certain office, when receiving an incoming call to a representative telephone number, a plurality of telephone machines ring multicastingly and someone among a plurality of staffs answers to the incoming call. Herein, in order to realize a telephone response (answering) as if a staff is present at the office even when the staff is not working at the office, it is considered to forward the telephone line [a telephone communication connection which has been established] to a terminal owned by the staff at his home or elsewhere. However, in the conventional telephone line forwarding service, the telephone line [the connection which has been established] is initially connected to a forwarding destination terminal to ring (call) the forwarding destination terminal. In other words, in the conventional telephone line forwarding service, one staff, one terminal and one telephone number as the forwarding destination have been previously designated. Therefore, it is impossible to simultaneously ring a plurality of terminals, thus the situation in which someone among a plurality of staffs answers to the call cannot be realized. Herein, even if a technology of Patent Literature 1 is adopted, merely realized is that a staff as the forwarding destination may select a terminal as a connection destination.

On the other hand, the server apparatus 10 of the present invention firstly multicastingly notifies the plurality of staff terminals 20*a*-*c* of an occurrence of the incoming call at once. This notification is performed before connecting a telephone line [forwarding the connection which has been established] using, for example, a message via an internet. By virtue of the broadcasting notification, a situation is realized, in which someone among a plurality of staffs responds to the call. In addition, when receiving an answering operation from a certain staff (first staff) among the plurality of staffs, the server apparatus 10 calls a telephone number of a terminal of the staff to establish a telephone connection. As described above, according to the server apparatus 10, a telephone response as if a staff is at the office (or company) even when the staff is not working at an office is realized.

Exemplary Embodiment 1

Figure 2:
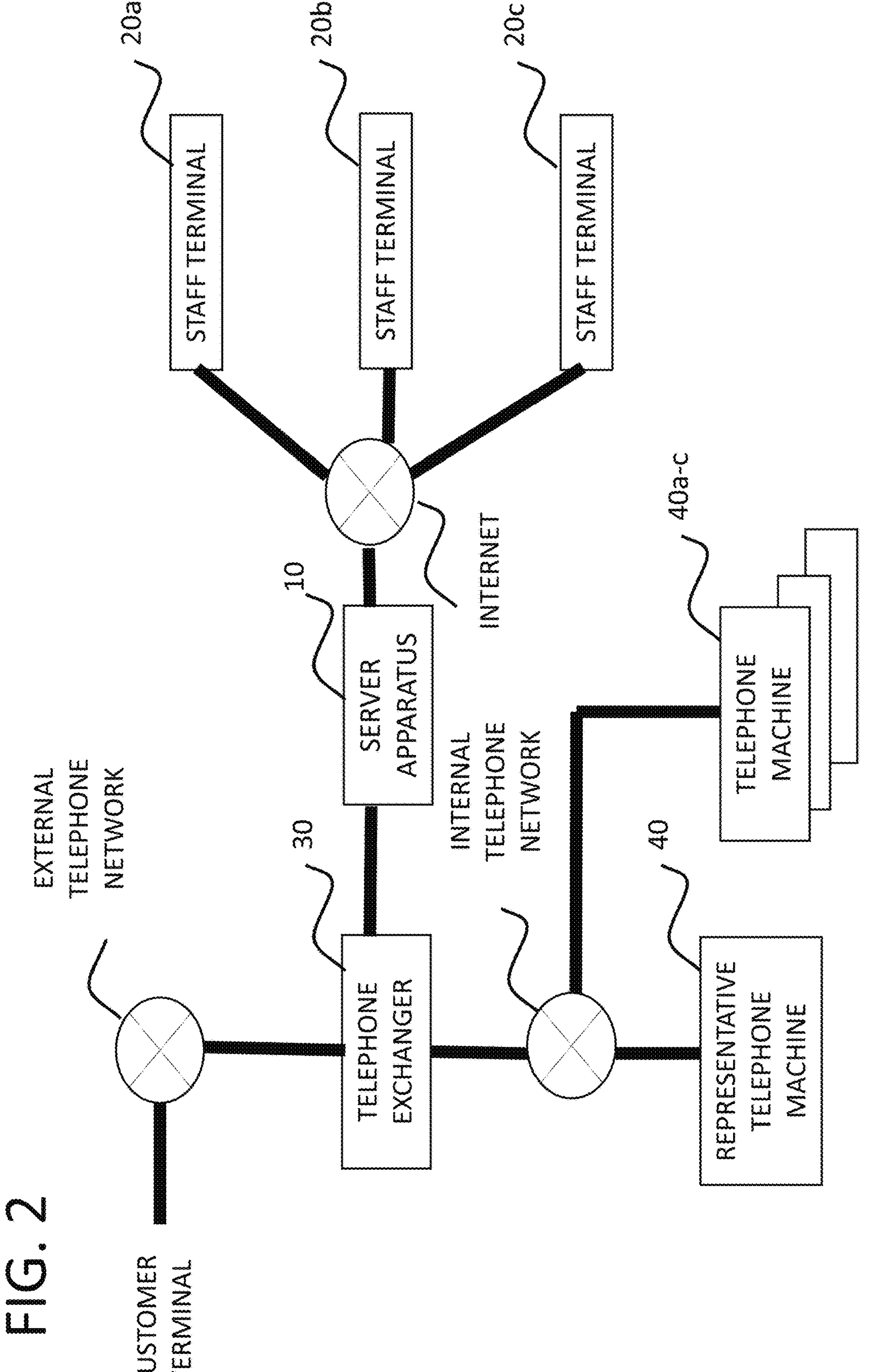
FIG. 2 is a diagram showing one outline of a call pickup system.

Next, a call pickup system comprising a server apparatus 10 of the present invention is explained. As illustrated in FIG. 2, the call pickup system comprises a server apparatus 10, staff terminals 20*a*-*c*, a telephone exchanger 30, and a representative telephone machine 40. The telephone exchanger 30 is connected to an external telephone network (external line, Public Switched Telephone Network) and connected to the representative telephone machine 40, telephone machines 40*a*-*c*, etc., via an internal telephone network (internal line, private telephone network, extension). The server apparatus 10 is connected to the telephone exchanger 30 via a bus and the like, to monitor processes by the telephone exchanger 30. In addition, the server apparatus 10 is connected to the staff terminals 20*a*-*c* via a network (for example, internet) other than the telephone networks, and functions as a cloud server. An application for utilizing a cloud service is installed in the staff terminals 20*a*-*c*. The cloud service and the application are exemplified by, for example, a Microsoft Teams of Microsoft. In addition, the staff terminals 20*a*-*c* have external telephone function via the external telephone network. (Note that, in FIG. 2, telephone connection lines to the staff terminals 20*a*-*c* are omitted.) Under such premise, at first, services provided by a call pickup system of the present invention are explained.

(1) Representative Incoming Call Notification

As illustrated in FIG. 3, when receiving an external incoming call to a representative telephone number from a customer terminal (1-1), the telephone exchanger 30 causes the representative telephone machine 40 to ring (1-2). At that time, the server apparatus 10 detects the incoming call to the representative telephone number (1-3) and multicastingly notifies the staff terminals 20*a*-*c* at once of an occurrence of the incoming call via the internet (1-4).

The staff terminals 20*a*-*c* that have received the incoming call notification from the server apparatus 10 presents an image, for example, indicated in FIG. 4 on a display by virtue of the installed application. Concretely, the staff terminals 20*a*-*c* presents (displays) information that an external incoming call from a caller (090xxxxxxxxxx) to the representative telephone number (04-7185-xxxx) has been received and the representative telephone machine 40 (internal network call [internal telephone number]: 1000) is ringing.

In addition, the staff terminals 20*a*-*c* also display choices of whether answering to the external incoming call as an external telephone or answering to the external incoming call as an internal telephone.

Concretely, the staff terminals 20*a*-*c* display buttons "ANSWER by 090xxxxyyyy" and "return call by 090xxxxyyyy" for answering as an external telephone. Further, the staff terminals 20*a-c* display buttons "ANSWER by 2000" and "RETURN CALL by 2000" for answering as an internal telephone.

In addition, the other staff terminals 20*a-c* may display information that any one of the staff terminals 20*a-c* is "ON A CALL" or "OUT OF SERVICE AREA". Further, even in a case where an incoming call externally from the customer terminal to the representative telephone number had been forwarded to another telephone machine, the representative incoming call notification may be also performed.

(2) Representative Telephone Response

When an answering operation is received from a staff terminal 20*a* (2-1), the server apparatus 10 establishes a telephone connection line (session) between the customer terminal and the staff terminal 20*a* (2-2).

Figure 5:
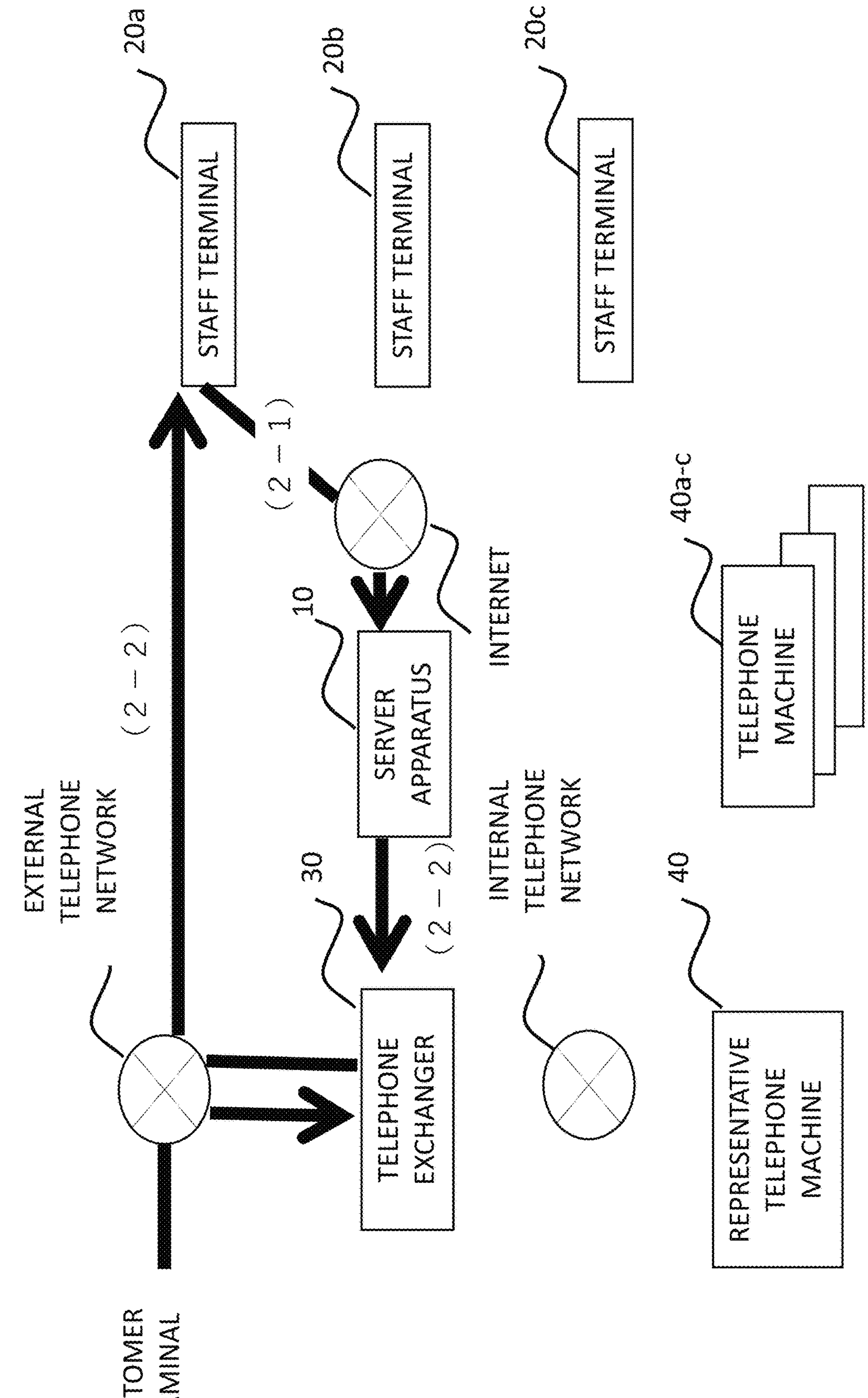
FIG. 5 is a diagram showing one outline of a representative telephone response.

Concretely, as illustrated in FIG. 5, when receiving an answering operation indicating answering to the external incoming call as an external telephone (2-1), the server apparatus 10 performs an external incoming call to a telephone number of the staff terminal 20*a* through the telephone exchanger 30 to establish a telephone connection (2-2). At that time, an external telephone connection line (session) between the customer terminal and the telephone exchanger 30 and an external telephone connection line (session) between the telephone exchanger 30 and the staff terminal 20*a* are established. In other words, the telephone exchanger 30 relays an external telephone communication between the customer terminal and the staff terminal 20*a*. Herein, the external telephone may be a fixed telephone in a home.

Figure 6:
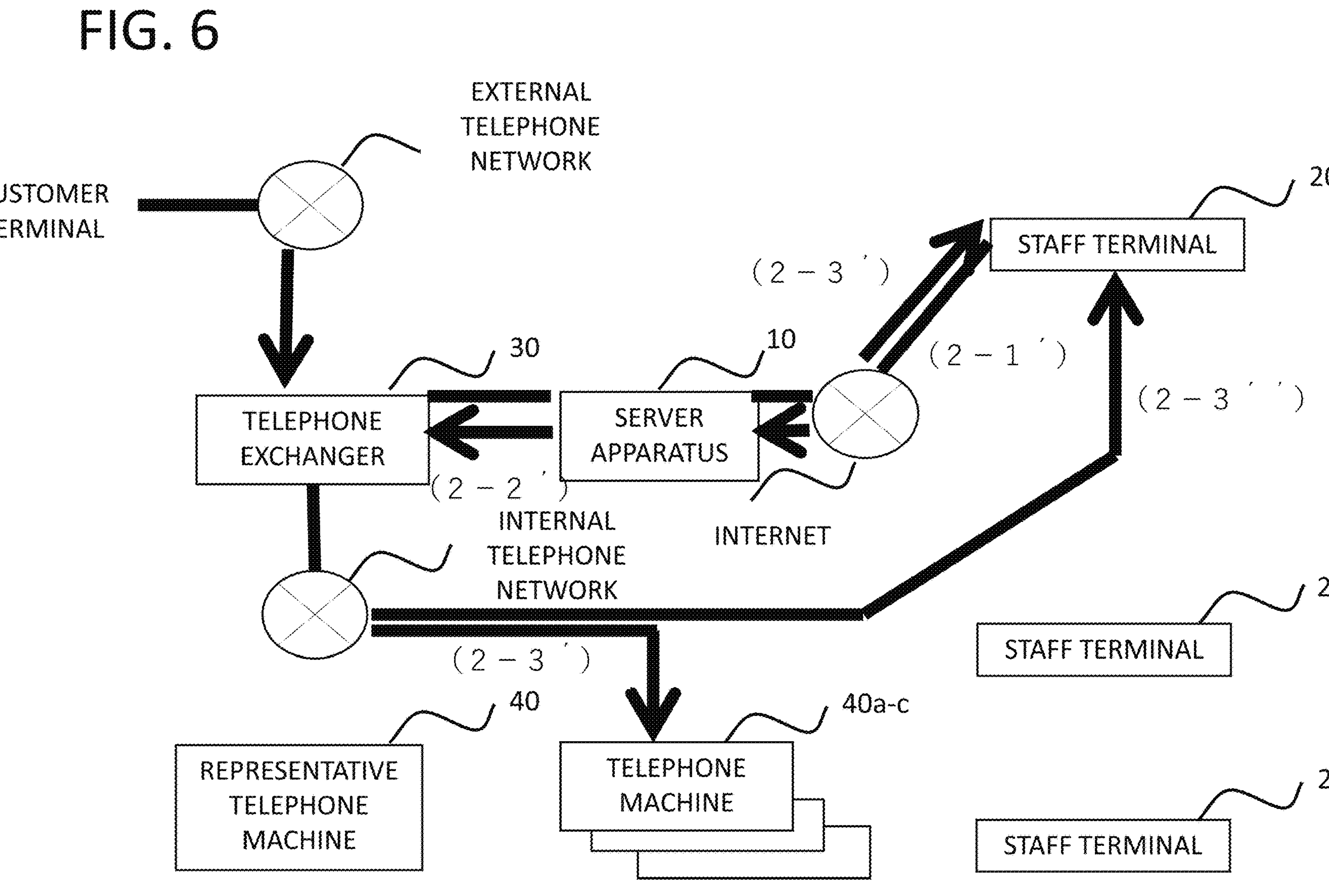
FIG. 6 is a diagram showing one outline of the representative telephone response.

On the other hand, as illustrated in FIG. 6, when receiving an answering operation indicating answering to the external incoming call as an internal telephone (2-1'), the server apparatus 10 establishes an internal telephone communication connection line (session) between itself and the telephone exchanger 30 (2-2'). In addition, the server apparatus 10 establishes a telephone connection line (session) between the customer terminal and the telephone machine 40*a* via the telephone exchanger 30 (2-3'). At that time, an external telephone connection line (session) between the customer terminal and the telephone exchanger 30 and an internal telephone connection line (session) between the telephone exchanger 30 and the telephone machine 40*a* are established. Herein, the internal telephone may be the staff terminals 20*a-c* having an internal telephone function using a cloud service (2-3").

Herein, in a case of receiving an answering operation indicating answering to the external incoming call from staff terminals 20*b, c* after establishment of the telephone connection to the customer terminal (including a case where answering to the external incoming call is made using the representative telephone machine 40), the staff terminals 20*b, c* are caused to display "RESPONSE FAILURE".

(3) Representative Telephone Response Notification

Figure 8:
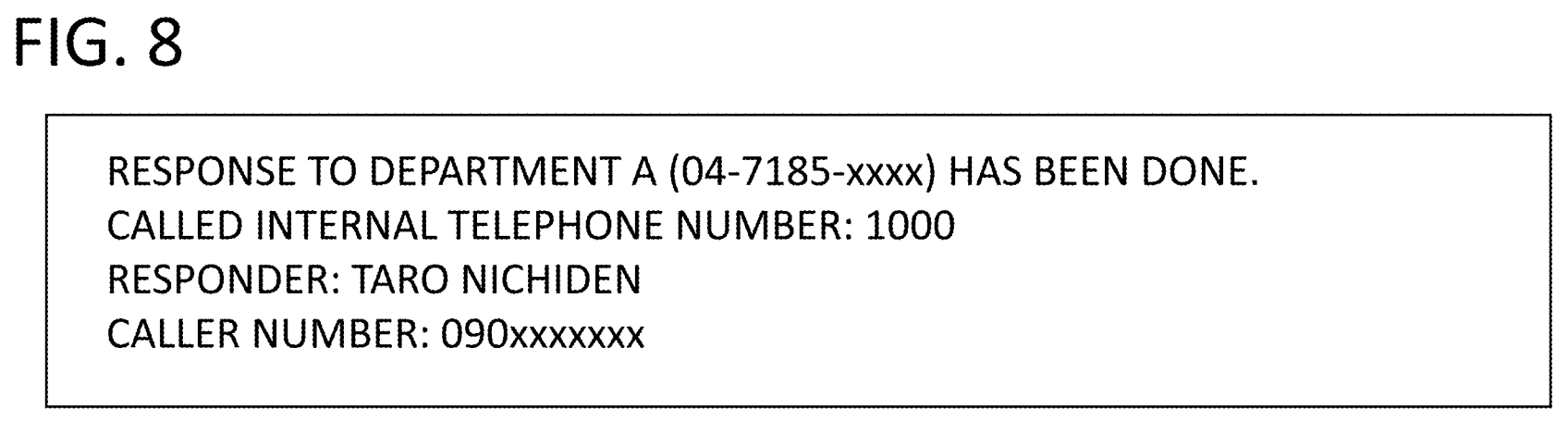

When the telephone connection line (session) between the customer terminal and the staff terminal 20*a* is established, the server apparatus 10 presents an image for switching operation (for telephone forwarding) on a display of the staff terminal 20*a* (for example, FIG. 7). In addition, the server apparatus 10 presents an image indicating information that answering to the external incoming call has been already done on displays of the staff terminals 20*b, c* (for example, FIG. 8).

(4) Representative Telephone Switching (Relaying)

Figure 9:
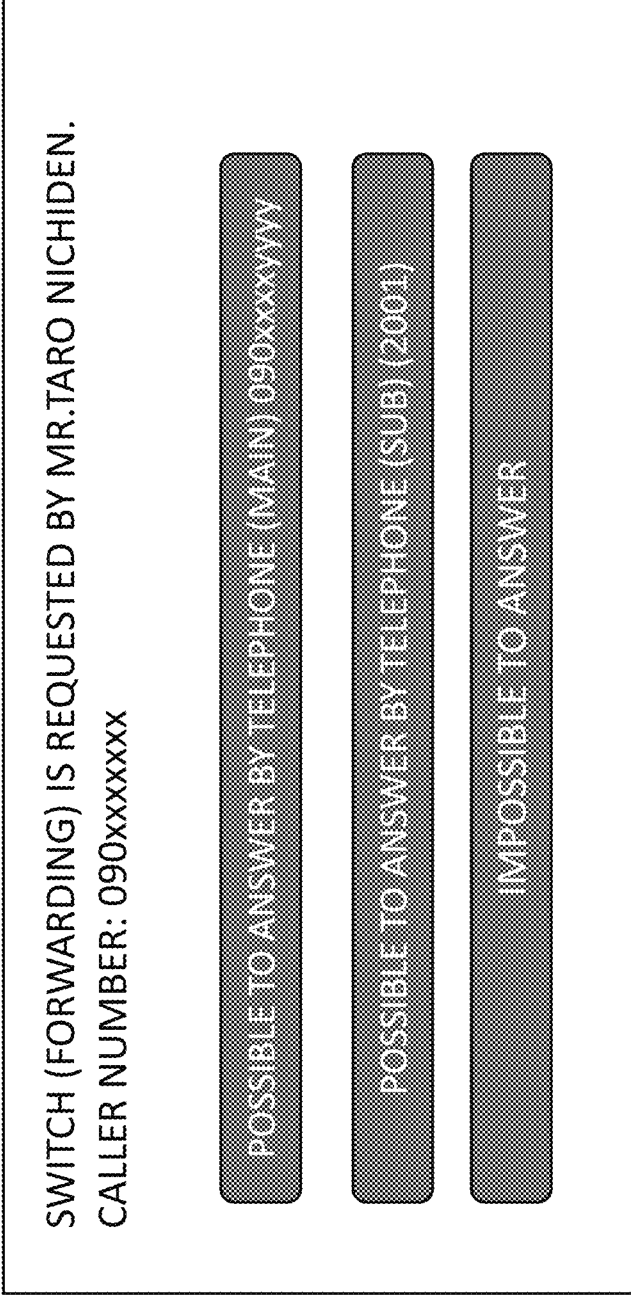
FIG. 9 is a diagram showing one example of information to be notified at the time of representative telephone switching.
Figure 10:
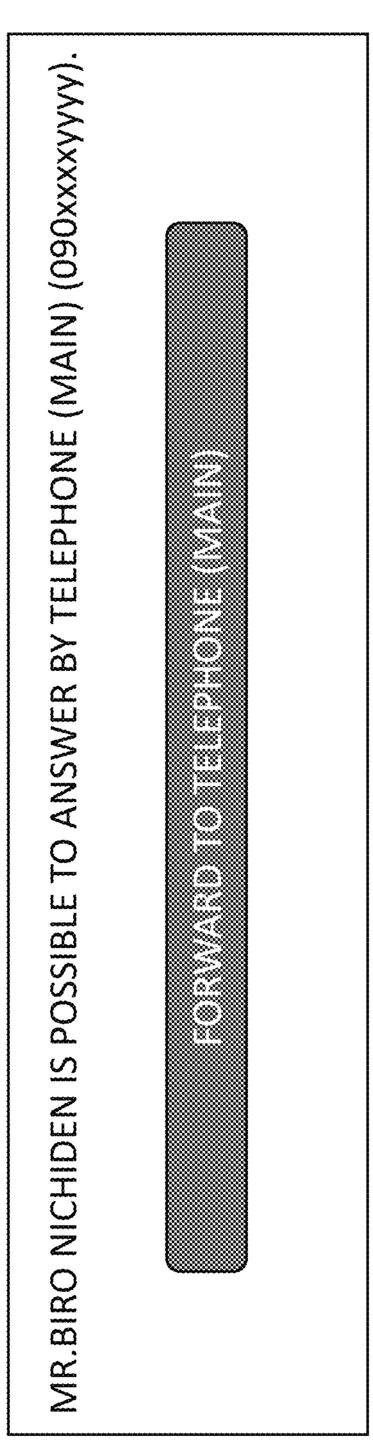
FIG. 10 is a diagram showing one example of information to be notified at the time of representative telephone switching.
Figure 12:
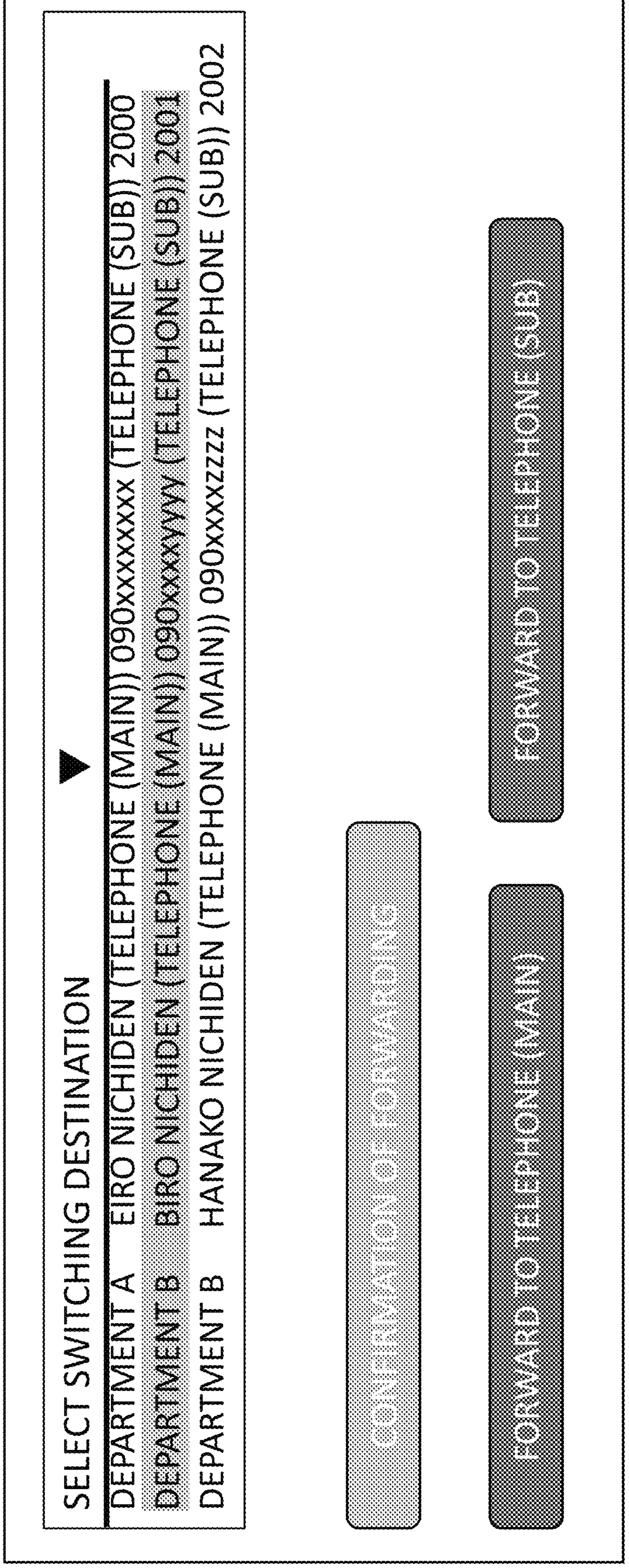
FIG. 12 is a diagram showing one example of information to be notified at the time of representative telephone switching.

There is a case where it is required to forward a telephone connection to the staff terminal 20*c* as a result of conversation between the customer terminal and the staff terminal 20*a* (i.e., between the customer and Taro Nichiden who is an owner of the staff terminal 20*a*). In such switching operation case, the server apparatus 10 receives a [instruction] from the staff terminal 20*a* and establishes a telephone connection line (session) between the customer terminal and the staff terminal 20*c* as a forwarding destination. Concretely, when "DISPLAY FORWARDING DESTINATION" is operated on the image shown in FIG. 7, the server apparatus 10 presents an image in which a forwarding destination terminal and a forwarding method may be designated on a display of the staff terminal 20*a* (for example, FIG. 12). Family name and first name of a staff as a forwarding destination (an owner of staff terminal 20*c*) may be also input. When the staff terminal 20*c* is selected on the image shown in FIG. 12 and then "CONFIRMATION OF FORWARDING" is operated, the server apparatus 10 presents an image for switching response (relaying) [accepting the telephone connection to be forwarded] on a display of the staff terminal 20*c* (for example, FIG. 9). Herein, when the server apparatus 10 receives an answering operation indicating answering to the external incoming call as an external telephone communication (possible to answer as Telephone (main)), the server apparatus 10 presents an image for forwarding operation in which a forwarding method is designated on a display of the staff terminal 20*a* (for example, FIG. 10). And then, the server apparatus 10 establishes an external telephone connection line (session) between the staff terminal 20*c* and the telephone exchanger 30 as a response to an answering operation received from the staff terminal 20*a*. Herein, when an operation indicating a switching response is impossible is performed on the staff terminal 20*c*, an image indicating such context is presented on a display of the staff terminal 20*a* (for example, FIG. 11). According to the present exemplary embodiment, it is realized to switch (forward) telephone connection without concerning about whether or not a staff as a forwarding destination is working at an office (or company).

On the other hand, it is also possible that a staff as an owner of the staff terminal 20*a* and a staff as an owner of the staff terminal 20*c* perform a communication using a cloud service, to designate a forwarding method to the staff terminal 20*c* by the staff terminal 20*a*.

(5) Representative Telephone Answering Using Representative Telephone Machine 40

In a case where answering to the external incoming call is performed using the representative telephone machine 40, the server apparatus 10 presents on displays of the staff terminals 20*a-c* an image indicating information that answering to the external incoming call has been done using the representative telephone machine 40 (for example, FIG. 13). In addition, the server apparatus 10 may present an image for the switching operation (for telephone forwarding) (FIG. 7) on a PC (personal computer) of an operator who is answering using the representative telephone machine 40.

(6) Representative Telephone Intermediary Abandonment Notification

Figure 14:
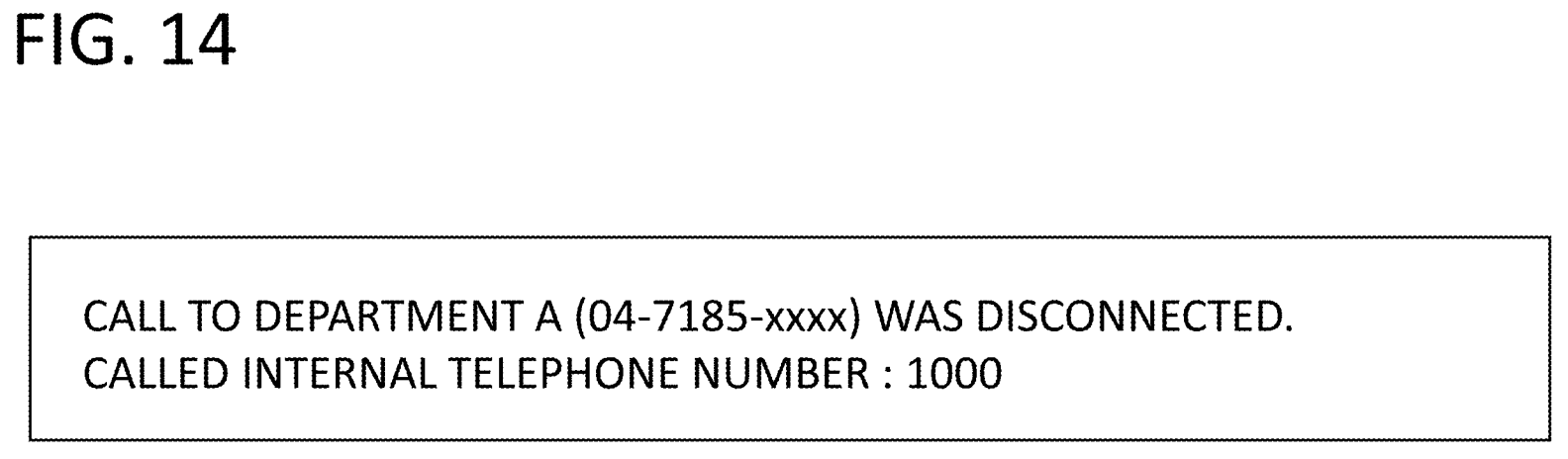

There is a case where a customer gives up on the way and abandons establishment of telephone connection to the representative telephone number. In such case, the server apparatus 10 presents an image indicating that such situation has occurred on displays of the staff terminals 20*a-c* (for example, FIG. 14).

(7) Return Call

There is a case where a staff performs a return call to the incoming call to the representative telephone number which had been abandoned by a customer. In such case, the server apparatus 10 receives a return call operation ("RETURN CALL by 090xxxxyyyy" or "RETURN CALL by 2000" in the image of FIG. 4) from, for example, the staff terminal 20*a*. In addition, the server apparatus 10 establishes a telephone connection line (session) between the staff terminal 20*a* and the telephone exchanger 30 according to the received operation [instruction] and performs an incoming call to the customer terminal via the telephone exchanger 30.

(8) Return Call Notification

Figure 15:
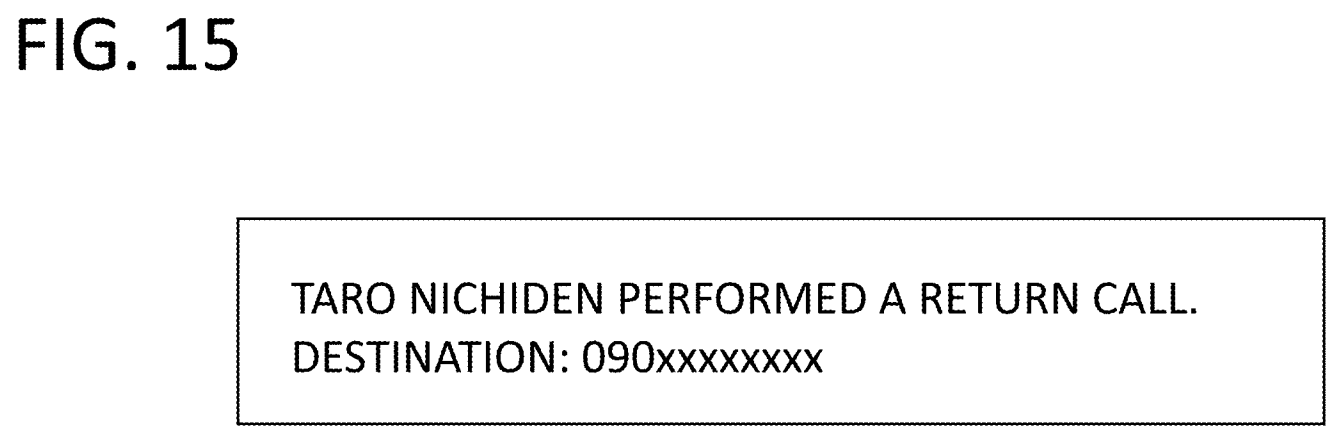

In a case where the return call from the staff terminal 20*a* to the customer terminal is performed, the server apparatus 10 presents an image indicating such situation has occurred on displays of the staff terminals 20*b, c* (for example, FIG. 15).

(9) Determination for Out of Service Time

It is also possible to set days of a week, time zone, etc., for accepting external incoming call to the representative telephone number from a customer terminal. When an external incoming call from a customer terminal to the representative telephone number is received within a time zone in which no external incoming call is accepted, the server apparatus 10 notifies the customer terminal of a message indicating that it is out of service time.

Next, configurations of each apparatus are explained.

The staff terminals 20*a-c* are, for example, a smartphone having a function for presenting a notification received from the server apparatus 10 on their displays and a function for telephone communication. Herein, the function for presenting a notification and the function for telephone communication may be realized on independent apparatuses. For example, a PC (personal computer) may be adopted as an apparatus for presenting a notification, and a fixed telephone may be adopted as a telephone communication apparatus. As the other configurations of the staff terminals 20*a-c*, configurations of a standard smartphone may be applied thereto, thus explanations thereof are omitted.

The telephone exchanger 30 may be referred to as PBX: Private Branch eXchanger, which realizes an internal telephone communication within an office and an external telephone communication to an external area of the office (or company). The representative telephone machine 40 is a telephone machine to which a representative telephone number (03-0000-0000) is set. The telephone machines 40*a-c* are a telephone machine arranged in an office. As the telephone exchanger 30, the representative telephone machine 40 and the telephone machines 40*a-c*, a standard configuration may be applied, thus explanations thereof are omitted.

Figure 16:
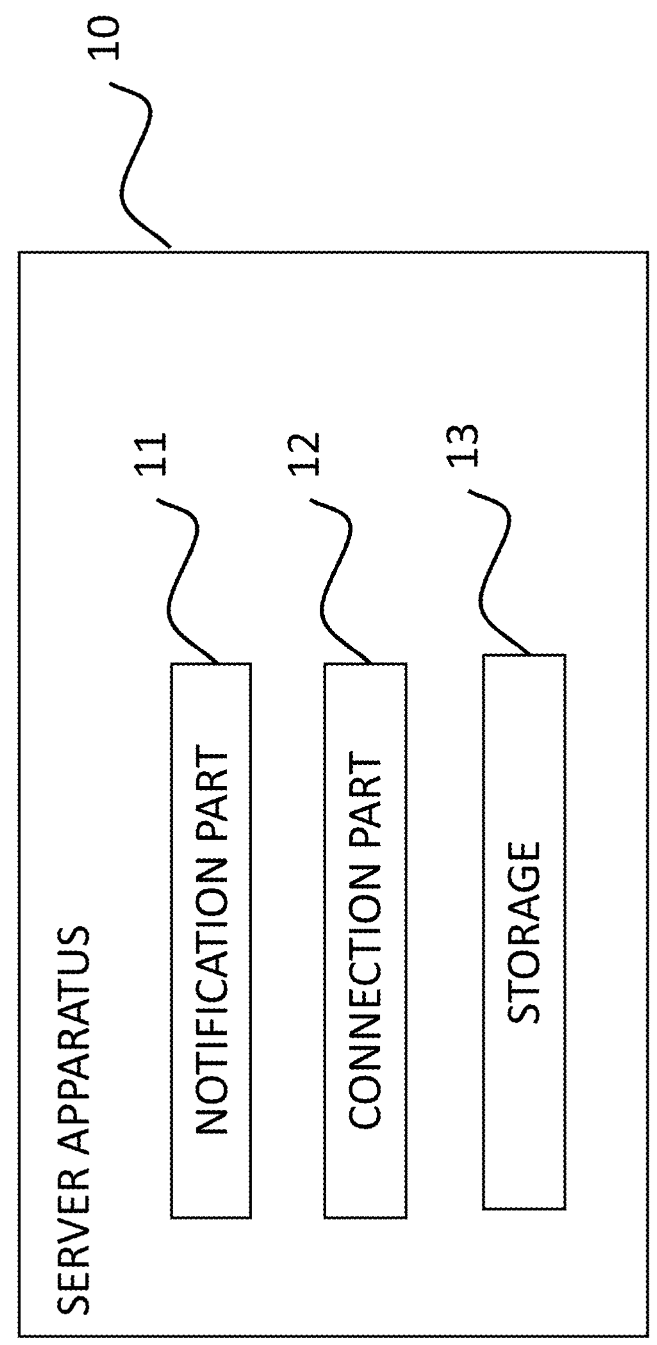
FIG. 16 is a block diagram showing a configuration of a server apparatus 10.

As illustrated in FIG. 16, the server apparatus 10 of the exemplary embodiment 1 comprises a notification part 11, a connection part 12 and a storage 13. The storage 13 stores telephone numbers and terminal information of the staff terminals 20*a-c* in association with the representative telephone number. The terminal information is used for incoming call notification using a cloud service.

The notification part 11 monitors the telephone exchanger 30 to detect a process by the telephone exchanger 30 for ringing the representative telephone machine 40 upon an occurrence of an incoming call from a customer terminal to the representative telephone number. At that time, the notification part 11 makes reference to the storage 13 to acquire the telephone numbers of the staff terminals 20*a-c*. In addition, the notification part 11 multicastingly notifies at once the staff terminals 20*a-c* of the occurrence of the incoming call via a network different from a telephone network. Further, the notification part 11 presents each staff via staff terminals 20*a-c* of choices of connection methods including a connection via an external telephone network, a connection via an internal telephone network. Further, the notification part 11 notifies the staff terminals 20*a-c* that a response to the incoming call to representative telephone number has been performed, and a telephone connection to the representative telephone number has been abandoned at an intermediary.

When receiving an answering operation from a staff terminal 20*a*, the connection part 12 calls a telephone number of a staff terminal 20*a* via the telephone exchanger 30 to establish a telephone connection. The connection part 12 also controls the telephone exchanger 30 to establish a telephone connection line (session) between the customer terminal and one of the staff terminals 20*a-c*. In addition, when receiving an answering operation [instruction] including a connection method from the staff terminal 20*a*, the connection part 12 establishes a telephone connection to the staff terminal 20*a* according to the received connection method. Further, when receiving a return call operation from the staff terminal 20*a*, the connection part 12 performs an incoming call to the customer terminal which had made an incoming call to the representative telephone number so as to establish a telephone connection.

Next, a flow of processes by the server apparatus 10 is explained. As illustrated in FIG. 17, when receiving an incoming call to a representative telephone number (Step S01, YES), the server apparatus 10 determines whether it is within a service time or not (Step S02). In a case where it is out of service time (Step S02, NO), the server apparatus 10 notifies a customer terminal of a message indicating that it is out of service time (Step S03), and waits another incoming call to the representative telephone number again.

On the other hand, in a case of within a service time (Step S02, YES), the server apparatus 10 causes the representative telephone machine 40 to ring and multicastingly notifies the staff terminals 20*a-c* of an occurrence of an incoming call (Step S04). Herein, in a case where a telephone connection to the representative telephone number is abandoned (Step S05, YES), the server apparatus 10 performs representative telephone intermediary abandonment notification to the staff terminals 20*a-c* (Step S06). After that, when receiving a return call operation from a staff terminal 20*a* (Step S07, YES), the server apparatus 10 establishes a telephone connection between the staff terminal 20*a* and the telephone exchanger 30, and performs an incoming call to the customer terminal via the telephone exchanger 30 (Step S08). In addition, the server apparatus 10 presents on displays of the staff terminals 20*b, c* that a return call has been made from the staff terminal 20*a* (Step S09).

In a case where the telephone connection the representative telephone number is not abandoned (Step S05, NO) and an answering operation from a staff terminal 20*a* is received (Step S10, YES), the server apparatus 10 establishes a telephone connection line (session) between the customer terminal and the staff terminal 20*a* (Step S11). In addition, the server apparatus 10 performs representative telephone response notification to the staff terminals 20*a-c* which have not performed the answering operation (Step S12).

After Step S09 and Step S12, the server apparatus 10 performs, upon needed, representative telephone switching that establishes a telephone connection line (session) between the customer terminal and the staff terminal 20*c* as a switching destination. In addition, when the telephone response is finished and the telephone connection line is cut off (session is terminated), the server apparatus 10 waits for another incoming call to the representative telephone number, again.

Figure 18:
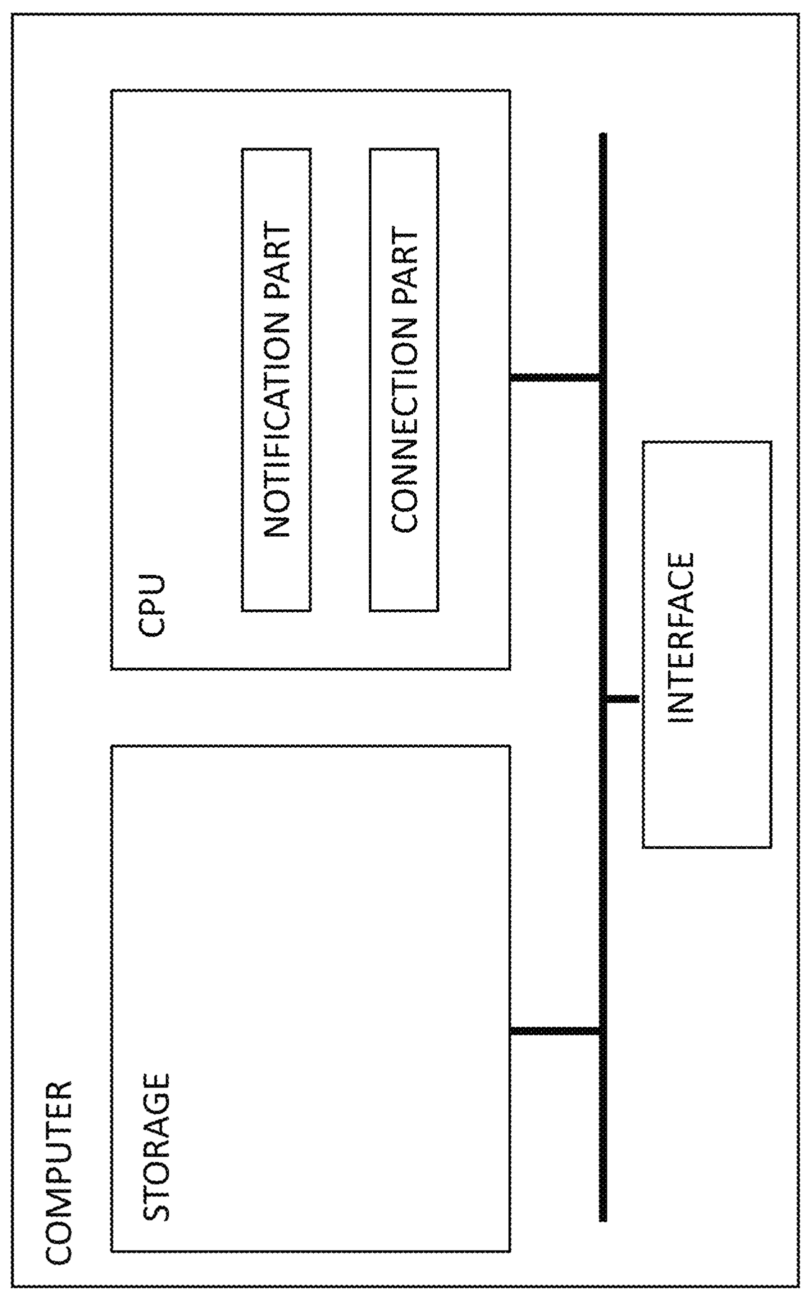
FIG. 18 is a diagram showing a computer as the server apparatus 10.

Herein, the present invention may be realized as a telephone connection method processed by a computer as the server apparatus 10 or a telephone connection program executed by the computer. That is, as illustrated in FIG. 18, the present invention may be realized in a manner that CPU (Central Processing Unit) of a computer reads out a telephone connection program from a storage to realize modules corresponding to the notification part 11 and the connection part 12.

A part or entire of the exemplary embodiment may be described as the following modes, but not limited thereto.

Mode 1

A server apparatus, comprising
- a notification part that, when receiving an incoming call to a representative telephone number, multicastingly notifies a plurality of staff terminals previously registered in association with the representative telephone number of an occurrence of the incoming call, and
- a connection part that, when receiving an answering operation from a first staff terminal, calls a telephone number of the first staff terminal via a telephone exchanger to establish a telephone connection thereto.

Mode 2

The server apparatus according to Mode 1, wherein the notification part performs notification via a network different from a telephone network.

Mode 3

The server apparatus according to Mode 1 or 2, wherein, when receiving a forwarding operation from the first staff terminal to a second staff terminal, the connection part calls a telephone number of the second staff terminal via the telephone exchanger to establish a telephone connection.

Mode 4

The server apparatus according to any one of Modes 1 to 3, wherein when receiving a forwarding confirmation operation from the first staff terminal to a second staff terminal,
- the notification part presents choices of connection methods including a connection via an external telephone network and a connection via an internal telephone network on the second staff terminal.

Mode 5

The server apparatus according to any one of Modes 1 to 4, wherein the notification part multicastingly presents choices of connection methods including a connection via an external telephone network and a connection via an internal telephone network to each of staffs through the plurality of staff terminals, and
- the connection part, when receiving an answering operation including a connection method from the first staff terminal, establishes a telephone connection according to a received connection method to the first staff terminal.

Mode 6

The server apparatus according to any one of Modes 1 to 5, wherein the notification part notifies a plurality of staff terminals that a response to the incoming call to the representative telephone number has been performed, or a telephone connection to the representative telephone number has been abandoned.

Mode 7

The server apparatus according to any one of Modes 1 to 6, wherein when receiving a return call operation from the first staff terminal, the connection part calls a terminal which had provided the incoming call to the representative telephone number to establish telephone connection.

Mode 8

A telephone connection method, comprising:
- a notification step of, when receiving an incoming call to a representative telephone number, multicastingly notifying a plurality of staff terminals previously registered in association with the representative telephone number of an occurrence of the incoming call, and
- a connection step of, when receiving an answering operation from a first staff terminal, calling a telephone number of the first staff terminal via a telephone exchanger to establish a telephone connection thereto.

Mode 9

A telephone connection program, causing a computer to execute:
- a process of, when receiving an incoming call to a representative telephone number, multicastingly notifying a plurality of staff terminals previously registered in association with the representative telephone number of an occurrence of the incoming call, and
- a connection process of, when receiving an answering operation from a first staff terminal, calling a telephone number of the first staff terminal via a telephone exchanger to establish a telephone connection thereto.

Herein, it is assumed that disclosure of each of the above Patent Literature is incorporated in the present application and may be used as a base or a part of the present invention as necessary. The exemplary embodiment(s) or example(s) may be modified or adjusted within the scope of the entire disclosure of the present invention, inclusive of claims, based on the basic technical concept of the invention. In addition, a variety of combinations or selections (including partial selection or non-selection) of disclosed variety elements (each element in each claim, each element in each example embodiment or each example, etc.) may be made within the claims of the present invention. That is, the present invention, of course, may cover a variety of modifications or corrections that may be made by those skilled in the art in accordance with the entire disclosure of the present invention, inclusive of claims, and the technical concept of the present invention. In particular, a numerical range described in the present application should be interpreted as specifically describing any numerical value or subrange included within said range, even if not explicitly described. Furthermore, each of the disclosure in the above cited references shall be deemed to be included in the description of the present application, when necessary, as part of the description of the present invention, in whole or in part, in combination with the description of the present application, in accordance with the concept of the present invention.

REFERENCE SIGNS

10: Server apparatus
11: Notification part

12: Connection part
13: Storage
20_a-c_: Staff terminals
30: Telephone exchanger
40: Representative telephone machine
40_a-c_: telephone machine

What is claimed is:

1. A server apparatus comprising:

at least a processor; and a memory in circuit communication with the processor, wherein the processor is configured to execute program instructions stored in the memory to perform processing comprising:

upon receiving an incoming call to a representative telephone number, multicasting a notification to a plurality of staff terminals previously registered in association with the representative telephone number of an occurrence of the incoming call, wherein the notification comprises a plurality of choices of connection methods including a connection via an external telephone network and a connection via an internal telephone network; and upon receiving, from a first staff terminal among the plurality of staff terminals, an answering operation including a connection method from among the plurality of choices of connection methods, establishing a telephone connection to the first staff terminal via a telephone exchanger according to the received connection method.

2. The server apparatus according to claim 1, wherein the processor multicasts the notification via a network different from a telephone network.

3. The server apparatus according to claim 1, wherein, upon receiving a forwarding operation from the first staff terminal to a second staff terminal among the plurality of staff terminals, the processor calls a telephone number of the second staff terminal via the telephone exchanger to establish a telephone connection.

4. The server apparatus according to claim 1, wherein upon receiving a forwarding confirmation operation from the first staff terminal to a second staff terminal, the processor presents a plurality of choices of connection methods on the second staff terminal.

5. The server apparatus according to claim 1, wherein the processor multicasts a notification to a plurality of staff terminals that a response to the incoming call to the representative telephone number has been performed or that a telephone connection to the representative telephone number has been abandoned.

6. The server apparatus according to claim 1, wherein upon receiving a return call operation from the first staff terminal, the processor calls a terminal which had provided the incoming call to the representative telephone number to establish a telephone connection.

7. A telephone connection method performed by at least a processor, the telephone connection method comprising:

upon receiving an incoming call to a representative telephone number, multicasting a notification to a plurality of staff terminals previously registered in association with the representative telephone number of an occurrence of the incoming call, wherein the notification comprises a plurality of choices of connection methods comprising a connection via an external telephone network and a connection via an internal telephone network; and upon receiving, from a first staff terminal among the plurality of staff terminals, an answering operation including a connection method from among the plurality of choices of connection methods, establishing a telephone connection to the first staff terminal via a telephone exchanger according to the received connection method.

8. A non-transitory program recording medium storing a telephone connection program executable by a computer to perform processing comprising:

upon receiving an incoming call to a representative telephone number, multicasting a notification to a plurality of staff terminals previously registered in association with the representative telephone number of an occurrence of the incoming call, wherein the notification comprises a plurality of choices of connection methods comprising a connection via an external telephone network and a connection via an internal telephone network; and upon receiving, from a first staff terminal among the plurality of staff terminals, an answering operation including a connection method from among the plurality of choices of connection methods, establishing a telephone connection to the first staff terminal via a telephone exchanger according to the received connection method.

9. The telephone connection method according to claim 7, wherein the multicasting of the notification is performed via a network different from a telephone network.

10. The telephone connection method according to claim 7, further comprising, upon receiving a forwarding operation from the first staff terminal to a second staff terminal, calling a telephone number of the second staff terminal via the telephone exchanger to establish a telephone connection.

11. The telephone connection method according to claim 7, further comprising:

upon receiving a forwarding confirmation operation from the first staff terminal to a second staff terminal, presenting choices of connection methods including a connection via an external telephone network and a connection via an internal telephone network on the second staff terminal.

12. The telephone connection method according to claim 7, further comprising:

multicasting a notification to a plurality of staff terminals that a response to the incoming call to the representative telephone number has been performed or that a telephone connection to the representative telephone number has been abandoned.

13. The telephone connection method according to claim 7, further comprising:

when receiving a return call operation from the first staff terminal, calling a terminal which has provided the incoming call to the representative telephone number to establish a telephone connection.

14. The non-transitory program recording medium according to claim 8, wherein multicasting of the notification is performed via a network different from a telephone network.

15. The non-transitory program recording medium according to claim 8, wherein the processing further comprises:

when receiving a forwarding operation from the first staff terminal to a second staff terminal, causing the computer to call a telephone number of the second staff terminal via the telephone exchanger to establish a telephone connection.

16. The non-transitory program recording medium according to claim 8, wherein the processing further comprises:

when receiving a forwarding confirmation operation from the first staff terminal to a second staff terminal, causing the computer to present choices of connection methods including a connection via an external telephone network and a connection via an internal telephone network on the second staff terminal.

17. The non-transitory program recording medium according to claim 8, wherein the processing further comprises:

multicasting a notification to a plurality of staff terminals that a response to the incoming call to the representative telephone number has been performed or that a telephone connection to the representative telephone number has been abandoned.

* * * * *